(12) United States Patent
Crawford et al.

(10) Patent No.: US 10,636,020 B1
(45) Date of Patent: Apr. 28, 2020

(54) SYSTEM FOR ADDING IDENTIFICATION ELEMENT TO CARD

(71) Applicant: Capital One Services, LLC, McLean, VA (US)

(72) Inventors: Melissa Crawford, Arlington, VA (US); Jeremy Goodsitt, Champaign, IL (US); Micah Price, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/557,003

(22) Filed: Aug. 30, 2019

(51) Int. Cl.
*G06Q 20/18* (2012.01)
*G06K 19/10* (2006.01)
*G07F 7/12* (2006.01)
*B32B 3/02* (2006.01)
*G07F 7/08* (2006.01)

(52) U.S. Cl.
CPC ............... *G06Q 20/18* (2013.01); *B32B 3/02* (2013.01); *G06K 19/10* (2013.01); *G07F 7/0846* (2013.01); *G07F 7/127* (2013.01); *B32B 2425/00* (2013.01)

(58) Field of Classification Search
CPC .................................................. G06Q 20/18
USPC ......................................................... 235/381
See application file for complete search history.

(56) References Cited

U.S. PATENT DOCUMENTS

| 5,096,228 | A | 3/1992 | Rinderknecht |
| 5,700,037 | A | 12/1997 | Keller |
| 7,273,234 | B1 | 9/2007 | Collins et al. |
| 2008/0000965 | A1* | 1/2008 | Zellner ............... G06Q 20/105 235/380 |
| 2009/0019751 | A1 | 1/2009 | Goetting |
| 2012/0222787 | A1 | 9/2012 | Caron |
| 2014/0380229 | A1* | 12/2014 | Volodin .............. G06F 3/04842 715/780 |
| 2015/0278801 | A1* | 10/2015 | Friedlander ............ G06Q 20/18 705/41 |
| 2017/0345234 | A1* | 11/2017 | Getachew .......... G07C 9/00007 |

FOREIGN PATENT DOCUMENTS

| WO | 2003/009220 A1 | 1/2003 |
| WO | 2014/074103 A1 | 5/2014 |
| WO | 2014/159693 A1 | 10/2014 |

* cited by examiner

*Primary Examiner* — Allyson N Trail
(74) *Attorney, Agent, or Firm* — Banner & Witcoff, Ltd.

(57) ABSTRACT

Aspects described herein may allow for prompting a user to access an on-line tool to create an identification element to be added to an exterior surface of a personal card. A server device may prompt the user to select a location for the identification element from a plurality of pre-selected locations on the personal card, each of the plurality of pre-selected locations being proximate edges of the personal card and outward of any of magnetic strips, chips, text, photos, and images on the personal card. The server device may modify an exterior surface of the personal card to include the identification element at the selected location, and deliver the personal card to the user.

20 Claims, 6 Drawing Sheets

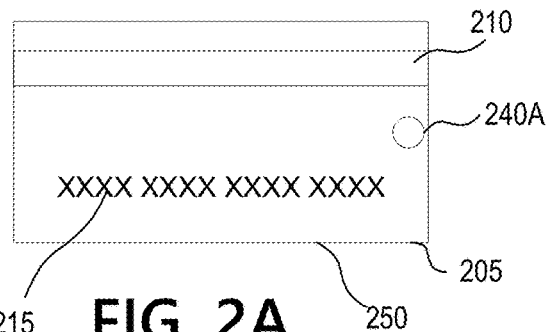
FIG. 2A
FIG. 2B
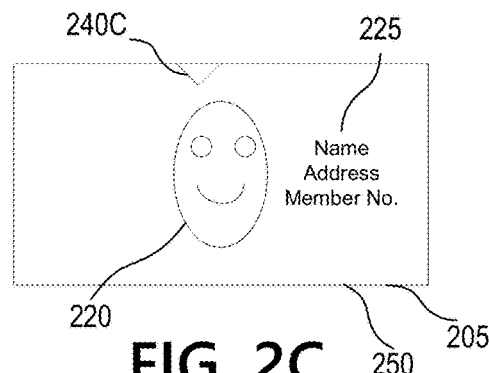
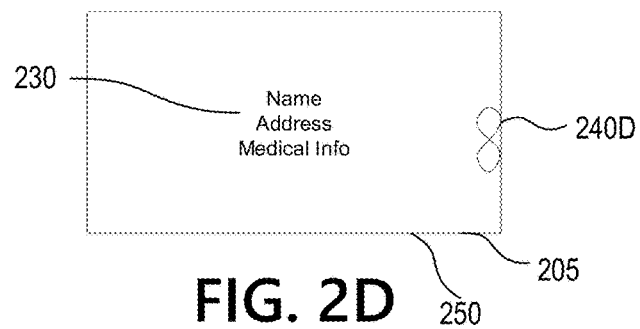
FIG. 2C
FIG. 2D
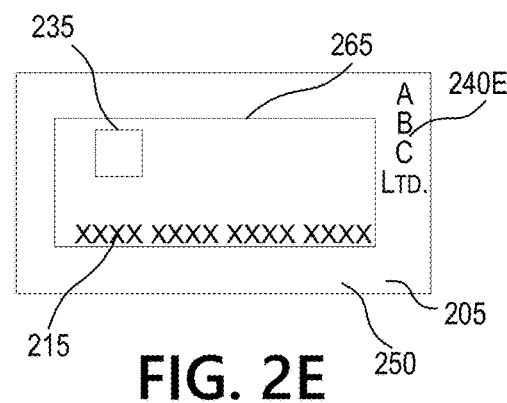
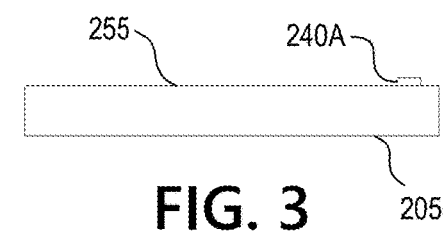
FIG. 2E
FIG. 3
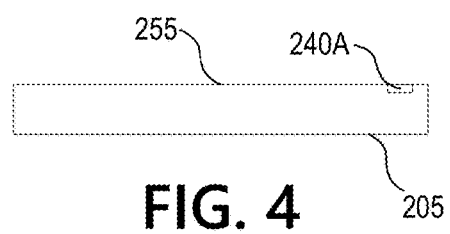
FIG. 4

SYSTEM FOR ADDING IDENTIFICATION ELEMENT TO CARD

FIELD OF USE

Aspects of the disclosure relate generally to adding an identification element to a personal card. More specifically, aspects of the disclosure may provide for enhanced systems for adding an identification element to a card proximate an edge of the card and outward of any magnetic strip, chip, text, photo, or image on the card.

BACKGROUND

Individuals often have multiple personal cards in their wallet or purse, such as credit cards, debit cards, ATM cards, medical insurance cards, membership cards, and other types of identification cards. Retrieving the cards from a wallet or purse can be difficult at times, as the cards have smooth surfaces without anything for the user to grasp other than the card itself. Further, identification of different cards can be difficult at times, since only a portion of the peripheral edges of the cards are visible when the card is in a slot of a wallet or purse. Differentiating between a number of cards with similar background colors can be challenging.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a system that allows a user to add an identification element to a personal card, such as a credit card. The identification element may be a raised element extending outwardly from an exterior surface of the card, or a recess formed in the exterior surface of the card, for example. Such identification elements allow a user to more easily grasp and remove the card from a wallet or purse, and helps the user distinguish between different cards that are housed in the user's wallet or purse.

Certain embodiments allow a user to design their own identification elements for different cards, as well as select the locations on the cards where they would like the identification elements positioned. Certain embodiments provide a server device that allows multiple users access to design tools to create custom identification elements. Other embodiments provide a stand-alone kiosk into which users can insert a card and have an identification element added to a card while they wait.

In accordance with certain embodiments, a computer-implemented method may include prompting, by a server device, a user to access an on-line tool to create an identification element to be added to an exterior surface of a personal card; receiving, by the server device, the identification element created by the user; prompting, by the server device, the user to select a location for the identification element from a plurality of pre-selected locations on the personal card, each of the plurality of pre-selected locations being proximate edges of the personal card and outward of any of magnetic strips, chips, text, photos, and images on the personal card; receiving, by the server device, the location for the identification element selected by the user; modifying, by the server device, an exterior surface of the personal card to include the identification element at the selected location; and delivering the personal card to the user.

In accordance with other aspects, a system may include a server device having a database of images of a plurality of existing credit cards of a user; the server device configured to provide a user with an on-line tool to create an identification element to be added to an exterior surface of an additional credit card of the user; receive, by the server device, the identification element created by the user; provide the user with a plurality of locations for locating the identification element on the additional credit card that are different than locations of identification elements on the plurality of existing credit cards; prompt the user to select one of the plurality of locations; receive, by the server device, the selected location; and modify the exterior surface of the additional credit card to include the identification element at the selected location as one of a raised element on the exterior surface, an indentation on the exterior surface, and a cutout in the exterior surface.

In accordance with further aspects, one or more non-transitory media storing instructions that, when executed by one or more processors, cause the one or more processors to perform steps including prompt a user to insert a personal card into a slot of a server device; scan, by the server device, the personal card with an image detection system to determine non-modifiable areas on the personal card that include any of magnetic strips, chips, text, photos, and images and identify modifiable locations proximate edges of the personal card; provide the user with a design tool to create a design for an identification element to be added to an exterior surface of the personal card; prompt the user to create a design for the identification element to be added to the personal card; upload, to the server device, the element created by the user; prompt the user to select one of the modifiable locations on the personal card for the identification element; upload, to the server device, a location selected by the user; modify the exterior surface of the personal card with the identification element created by the user at the selected location; and discharge the personal card from the slot of the server device.

By using computing devices and applications to add identification elements to their personal cards, individuals can more readily identify and retrieve a desired card when the user's cards are stored in a wallet or purse.

Corresponding apparatus, systems, and computer-readable media are also within the scope of the disclosure. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-E depict examples of a personal card modified in accordance with one or more illustrative aspects discussed herein;

FIG. 3 depicts an elevation view of an example of a modified personal card in accordance with one or more illustrative aspects discussed herein;

FIG. 4 depicts an elevation view of an alternative example of a modified personal card in accordance with one or more illustrative aspects discussed herein;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media for adding an identification element to a personal card of user.

Before discussing these concepts in greater detail, however, several examples of a computing device that may be used in implementing and/or otherwise providing various aspects of the disclosure will first be discussed with respect to FIG. 1.

Figure 1:
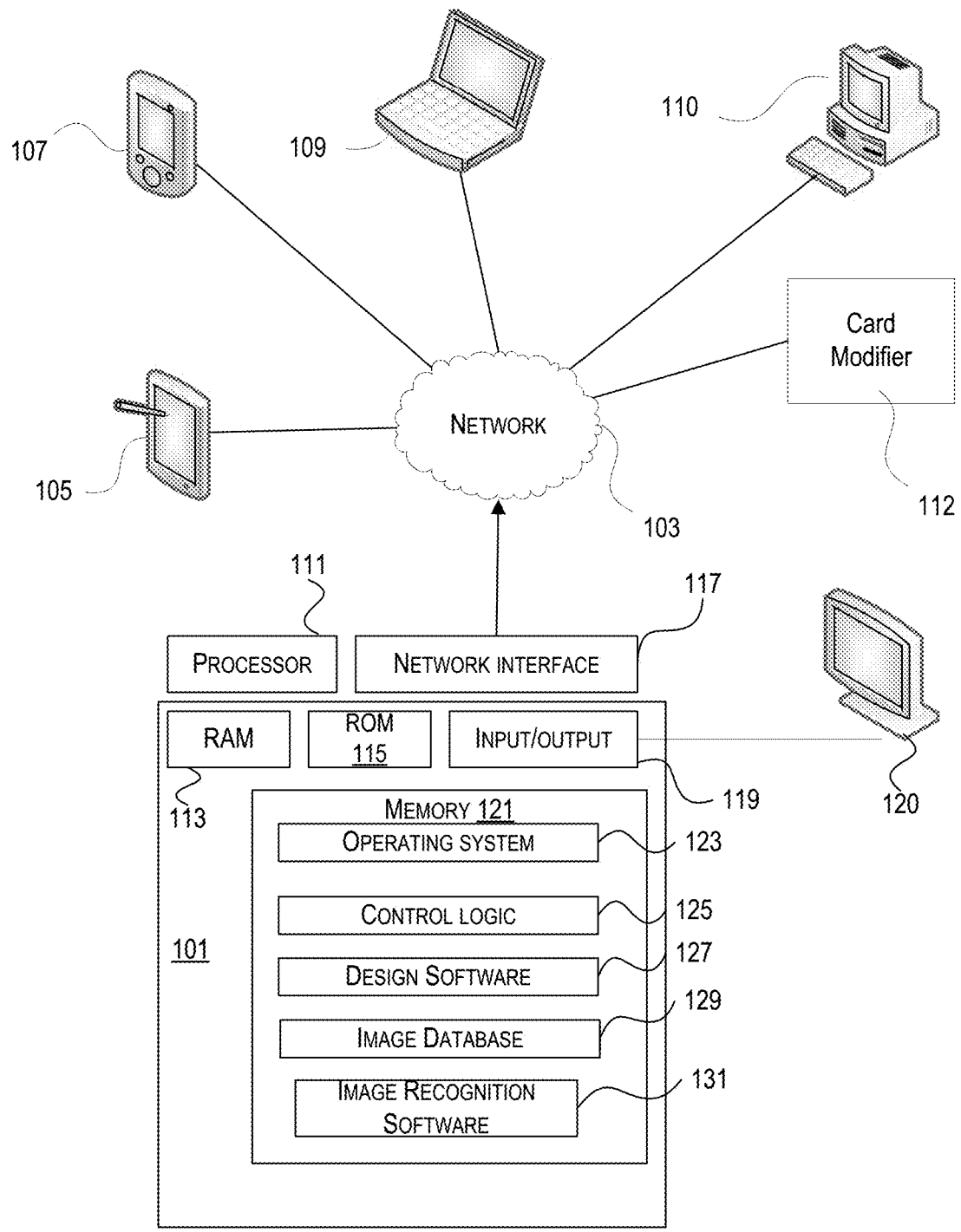
FIG. 1 depicts an example of a computing device that may be used in implementing one or more aspects of the disclosure in accordance with one or more illustrative aspects discussed herein.
Figure 5:
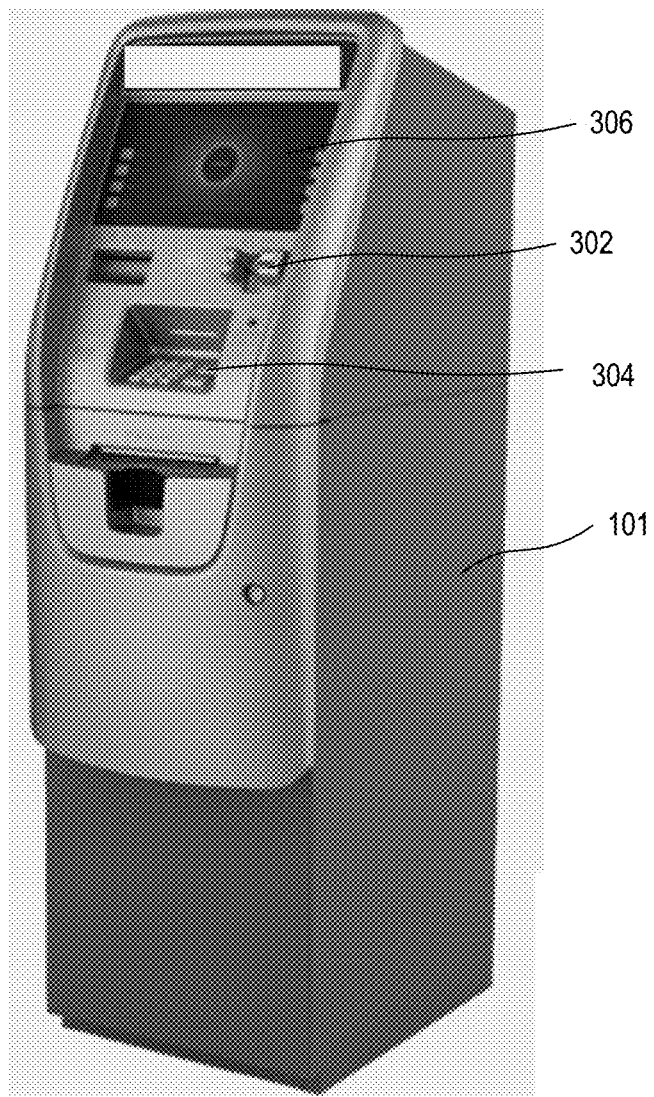
FIG. 5 depicts a perspective view of an alternative example of a computing device that may be used in implementing one or more aspects of the disclosure in accordance with one or more illustrative aspects discussed herein.

FIG. 1 illustrates one example of a computing device 101, or server device, that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device. For example, in some embodiments computing device 101 may be a stand-alone kiosk that a user can walk up to, or drive up to, and interact with.

A computing device 101 may, in some embodiments, operate in a standalone environment. In others, computing device 101 may operate in a networked environment. As shown in FIG. 1, various network nodes 101, 105, 107, 109, 110, 112 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, 110, 112 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations required by one or more applications stored on the computing device 101. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, design software 127, image database 129, and image recognition software 131. Furthermore, memory 121 may store various other databases and applications depending on the particular use. Control logic 125 may be incorporated in and/or may comprise a linking engine that updates, receives, and/or associates various information stored in the memory 121. In other embodiments, computing device 101 may include two or more of any and/or all of these components (e.g., two or more processors, two or more memories, etc.) and/or other components and/or subsystems not illustrated here.

Devices 101, 105, 107, 109, 110, 112 may have similar or different architecture as described with respect to computing device 101. Those of skill in the art will appreciate that the functionality of computing device 101 (or device 105, 107, 109, 110, 112) as described herein may be spread across multiple data processing devices, for example, to distribute processing load across multiple computers, to segregate transactions based on geographic location, user access level, quality of service (QoS), etc. For example, devices 101, 105, 107, 109, 110, 112 and others may operate in concert to provide parallel computing features in support of the operation of control logic 125 and/or design software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network for adding an identification element to a user's personal card.

Embodiments discussed herein depict an example method for modifying personal cards of users to include an identification element. The users may access an on-line design tool to create an identification element to be placed on one or more personal cards of each user. The personal cards can include credit cards, debit cards, ATM cards, medical insurance cards, membership cards, and other types of identification cards. Such cards may include magnetic strips, EMV chips, text, photos, and images. An identification element may be added to a user's card, proximate a peripheral edge of the card.

Server device 101 may utilize a card modifier 112 to add an identification element to user's personal cards. Card modifier 112 may be a punch press, for example, which may be used to create recesses and/or apertures, or cutouts, in the user's personal cards, which recesses and/or apertures serve to act as identification elements based on their shape and location. In other embodiments, card modifier 112 may be an embossing machine that creates raised elements, or projections, on the surface of the user's personal cards, which raised elements serve to act as identification elements based on their shape and location. It is to be appreciated that card modifier 112 may take other forms as well, and serves to create elements that extend outwardly from the exterior surface of the personal card, such as projections, or elements that extend inwardly into the exterior surface of the personal card, such as recesses.

Various embodiments of a personal card 205 are illustrated in FIGS. 2A-E. FIGS. 2A-B illustrate an embodiment where personal card 205 is a credit card, with a magnetic strip 210 and a card number 215. FIG. 2C illustrates an embodiment where personal card 205 includes a photo 220 of the user as well as text 225. In such an embodiment, personal card 205 could be a membership card, such as a gym membership card, with text 225 including the user's name, address, and membership number, for example. FIG. 2D illustrates an embodiment where personal card 205 includes only text 230. In such an embodiment, personal card 205 could be a user's medical information card, for example. FIG. 2E illustrates an embodiment where personal card 205 includes an EMV chip and a card number 215, such as found on a credit card, for example. It is to be appreciated that personal card 205 can be any type of card, and can include, for example, text, photos or other images, magnetic strips, EMV chips, and any combination of the above. The embodiments illustrated in FIGS. 2A-E are not exhaustive, and it is to be appreciated that personal card 205 can take on a variety of forms.

As illustrated in FIGS. 2A-E, personal cards 205 include identification elements 240A-E. As seen here, identification elements 240A-E are positioned on personal cards 205 proximate peripheral edges 250 of the cards. By positioning an identification element 240 proximate a peripheral edge 250 of a personal card 205, a user will be easily able to see the identification element 240 even when it is positioned in a slot in the user's wallet or purse.

In certain embodiments, identification elements 240A-E may be elements that are raised or recessed with respect to the surface of personal card 205. Thus, in such embodiments, identification elements 240A-E provide something that the user can grasp in order to help remove the personal card from a wallet or purse. For example, the user may be able to use their fingers, or a fingernail, to hook on or engage an identification element 240 of a card as they remove it from their wallet. By positioning an identification element 240 proximate a peripheral edge 250 of a personal card 205, a user will be easily able to use their fingers or a fingernail to hook the identification element and pull the personal card from the user's wallet or purse.

In the embodiment illustrated in FIG. 2A, identification element 240A is located proximate a right side edge 250 of personal card 205, as seen here. It is to be appreciated that identification element 240A can be positioned proximate any edge 250 of personal card 205, as discussed in greater detail below.

In the illustrated embodiment, identification element 240A has a circular shape. It is to be appreciated that in certain embodiments, as illustrated in FIG. 3, identification element 240A may be a projection that extends outwardly from an exterior surface 255 of personal card 205. As can be seen, it would be easy for the user to use their fingers, or a fingernail, to hook the projected identification element 240A and pull personal card 205 from a slot in a wallet or purse.

In other embodiments, as illustrated in FIG. 4, identification element 240A may be a recess formed in exterior surface 255 of personal card 205. As can be seen, it would also be easy for the user to use their fingers, or a fingernail, to hook the recessed identification element 240A and pull personal card 205 from a slot in a wallet or purse.

It is to be appreciated that identification element 240A can take on any desired shape. As illustrated in FIG. 2B, identification element 240B takes the form of an arc of a circle, which could be particularly advantageous in being able to be hooked by the fingernail of a user.

In certain embodiments, as illustrated in FIG. 2C, identification element 240C may be located along a longitudinal edge 250 of personal card 205 rather than along a side edge 250 as seen in the embodiments of FIGS. 2A-B. In this embodiment, identification element 240C takes on the shape of a caret, the apex of which provides an element for the user to grasp with their fingers or fingernail.

A user with a plurality of personal cards 205 in their wallet or purse can help distinguish one card from another through the use of different identification elements 240A-E. The user can advantageously put a different identification element 240A-E on each card, as well as put each identification element 240A-E in a different location, thereby allowing the user to quickly recognize a desired card by the particular identification element 240A-E on that card, and easily pull the card from their wallet or purse because of the location and structure of the identification element 240A-E.

In certain embodiments, as illustrated in FIG. 2D, server device 101 may allow a user to select a desired identification element 240D from a pre-selected set of design elements. For example, server device 101 may have a set of pre-selected shapes in image database 129 from which a user may select the shape for the identification element 240D for a particular personal card 205. In such an embodiment, server device 101 may provide the user with selection of simple geometric shapes from which to choose, including for example, the circular shape 240A seen in FIG. 2A, the arc shape 240B seen in FIG. 2B, and the caret shape 240C seen in FIG. 2C. It is to be appreciated that other exemplary shapes could include a line segment, a rectangle, a plurality of dots, etc. Other simple geometric shapes will become readily apparent to one skilled in the art, given the benefit of this disclosure.

In certain embodiments, server device 101 may allow a user to access design software 127 to select one of the pre-selected shapes in image database 129 and locate their desired shape in drag-and-drop fashion in a selected location on an image of a personal card 205. Once the user has selected the shape and its location, server device 101 may instruct card modifier 112 to modify a personal card 205 with the selected shape as the selected location.

In other embodiments, server device 101 may allow a user to access design software 127 in order to create a freeform design of their own for the identification element 240A-E on a particular card. By using design software 127 the user could create an identification element 240A-E that has a particular meaning to the user, which could help the user in more quickly identifying the particular personal card and distinguish the particular personal card from other personal cards of the user. As illustrated in FIG. 2D, the user could access design software 127 to create a shape of their own, such as the infinity symbol represented by identification element 240D. The user could then create a different shaped identification element 240D for each personal card 205 in their purse or wallet. It is to be appreciated that with the use of a design tool of design software 127 that allows the user to create a freeform design there is no limit to the type of design a user may create for the identification element 240A-E to be used on one or more personal cards 205.

In other embodiments, the user could upload an image from a user device 105, 107, 109, or 110 to be used as the identification element 240A-E on a particular personal card 205. User devices 105, 107, 109, or 110, could be, for example, a tablet device, a PDA, a laptop, or a personal computer. The user could obtain a desired image and upload it to server device 101 from any of user devices 105, 107, 109, or 110. Server device could then instruct card modifier 112 to use the uploaded image to modify the personal card 205.

Such an embodiment could help the user with branding through the use of logos, for example. As illustrated in FIG. 2E, identification element 240E may be a logo of a company of the user that has been uploaded to server device 101 and used on the user's personal card 205. Use of personal card 205 with the logo could provide additional exposure for the logo. This logo could be stored in image database 129 and then be used on other user's personal cards 205.

In certain embodiments, as seen in FIG. 2E, personal card 205 may include a marker or symbol 265 designating an area of personal card 205 where identification elements 240A-E should not be positioned so as to avoid interfering with text, images, photos, chips, or magnetic strips, for example. In certain embodiments, symbol 265 may be a visible a physical marker, such as a line printed on personal card 205. In other embodiments, symbol 265 may not be visible, and may be, for example, an electronic symbol generated by electronics embedded in personal card 205.

In certain embodiments, server device 101 may send instructions to card modifier 112 to modify a new personal card 205 with an identification element 240A-E. In other embodiments a user may wish to have one or more existing personal cards 205 modified to include identification elements 205. In such embodiments, server device 101 may be a stand-alone device, such as a kiosk, similar to an ATM machine, as illustrated in FIG. 3, that users would walk up to in order to modify an existing personal card 205. In other embodiments, server device 101 could be a stand-alone kiosk that is small enough to be located in an individual's home. In certain embodiments, server device 101 could be a 3D printer that can add identification elements 240A-E to the exterior surface 255 of personal card 205.

In such an embodiment, server device 101 may have a card slot 302 into which the user may insert their existing personal card 205. Server device 101 may also include a keyboard 304 and a display 306. Display 306 may be a touch screen display that allows the user to navigate through design software 127 when designing the identification element 240A-E to be added to personal card 205. In other embodiments, server device 101 may include a cursor (not shown).

Server device 101 may also include image recognition software that allows server device 101 to recognize the areas where text, images, photos, chips, magnetic strips, and other elements are positioned on personal card 205. Server device 101 can then restrict where the user is allowed to position identification element 240A-E on personal card 205 so that the identification element 240A-E does not interfere with the text, images, photos, chips, magnetic strips, and other elements on personal card 205.

In certain embodiments, a database of images of a plurality of existing credit cards 205 of a particular user may be uploaded to image database 129 of server device 101. In certain embodiments, the user may provide a plurality of credit cards 205 that are scanned and uploaded to image database 129. It is to be appreciated that the user could scan each of the credit cards 205 themselves and upload the images to image database 129 of server device 101. In other embodiments, server device 101 could access the images of the user's credit card 205 from images already in image database 129 and/or images from an image database of external entities, such as a financial institutions and card issuing entities. Once image database 129 has been updated with images of the user's existing credit cards 205, server device 101 can then allow a user to create and add an identification element 240A-E to an additional credit card 205 at a location different from locations of identification elements 240 A-E on the user's existing credit cards 205, thereby ensuring that each of the user's credit cards 205 has an identification element 240A-E in a unique location.

Figure 6:
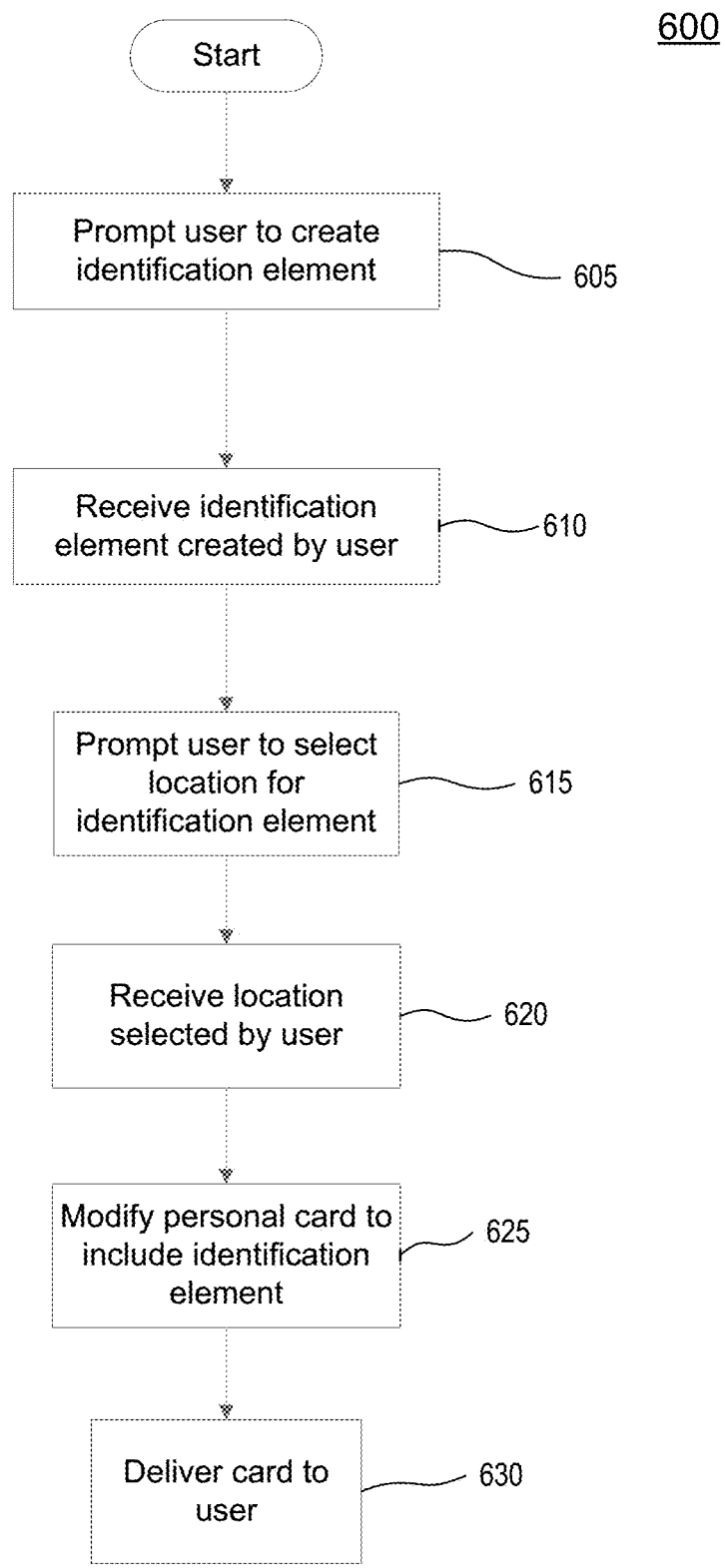
FIG. 6 depicts a flow diagram of an example method in accordance with one or more illustrative aspects discussed herein.

A method 600 of adding an identification element 240A-E to a personal card 205 is shown in FIG. 6. At step 605 of FIG. 6, server device 101 prompts a user to access an on-line tool using design software 127 to create an identification element 240A-E for a personal card 205. As discussed above, the on-line tool may allow the user to select an identification element 240A-E from a set of pre-selected design elements. In other embodiments, the on-line tool of design software 127 may allow the user to create a freeform design of any type for the identification element 240A-E. In yet further embodiments, the on-line tool of design software 127 may allow the user to upload a scanned image of a design for the identification element 240A-E. At step 610, server device receives the user's selection for the identification element 240A-E to be added to their personal card 205. At step 615, server device 101 prompts the user to select a location for identification element 240A-E from a plurality of pre-selected locations on personal card 205. Each of the pre-selected locations may be proximate an edge 250 of personal card 205 and outward of any magnetic strips, chips, text, photos, or images on personal card 205.

At step 620, server device 101 receives the location selected by the user for identification element 240A-E on personal card 205. At step 625, server device 101 modifies the exterior surface 255 of personal card 205 to include the selected identification element 240A-E at the selected location through the user of card modifier 112. At step 630, the modified personal card 205 is delivered to the user.

Figure 7:
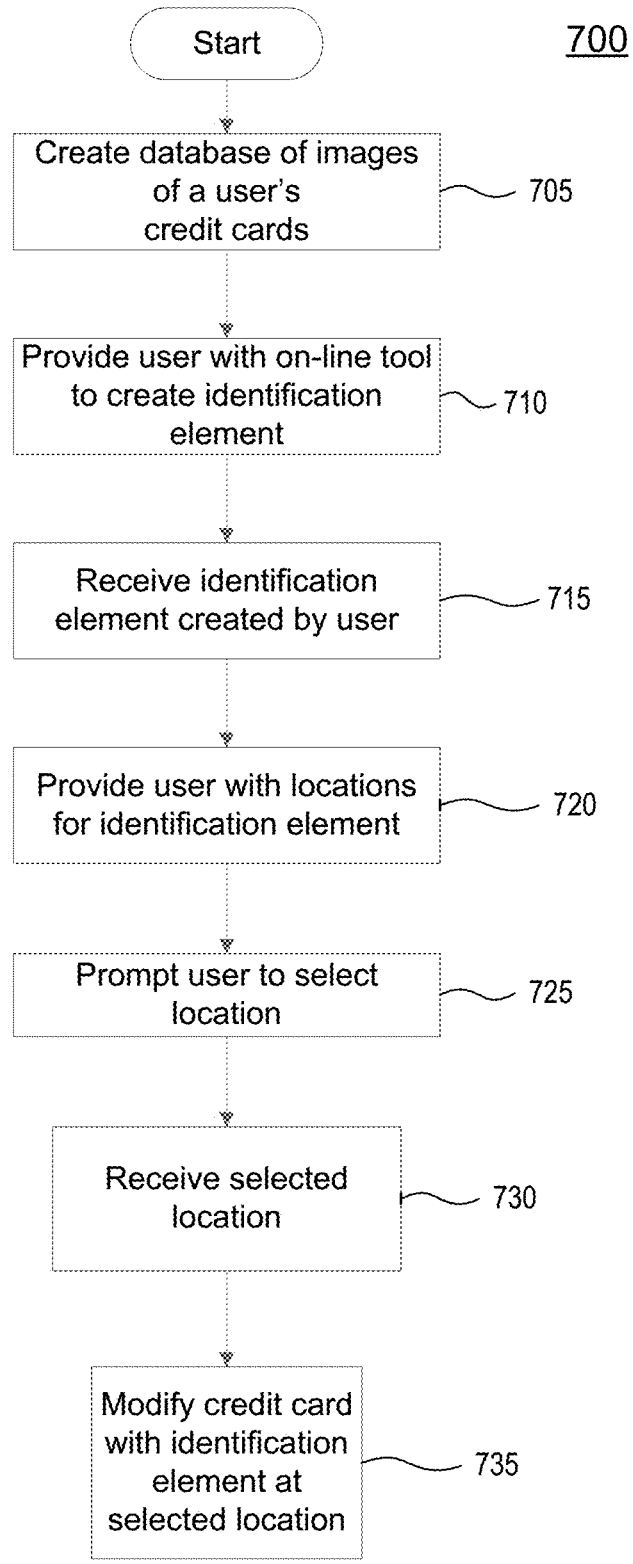
FIG. 7 depicts a flow diagram of an alternative example method in accordance with one or more illustrative aspects discussed herein.

An alternative method 700 of adding an identification element 240A-E to a personal card 205 is shown in FIG. 7. At step 705 of FIG. 7, server device 101 creates a database of images of a plurality of credit cards 205 of a user. In certain embodiments, a user may upload images of each of their existing credit cards 205, which may be stored by server device 101 in image database 129. In other embodiments, the images of existing credit cards 205 of the user may be uploaded to server device 101 by the card issuer for the respective existing credit card 205. In other embodiments, each card issuer could upload to server device 101 pre-selected locations for identification elements 240A-E on the existing credit cards the user has with that particular card issuer. At step 710, server device 101 may provide a user with an on-line tool of design software 127 to create an identification element 240A-E to be added to an exterior surface 255 of an additional credit card 205 of the user. At step 715, the identification element 240A-E created by the user is received by server device 101. At step 720, server device 101 provides the user with a plurality of pre-selected locations for locating identification element 240A-E on the additional credit card 205 that are different than the locations of identification elements 240 on the existing credit cards 205 of the user. At step 725, server device 101 prompts the user to select one of the pre-selected locations. At step 730, server device 101 receives the selected location for identification element 240A-E. At step 735, server device 101 modifies the additional credit card 205 with the identification element 240A-E created by the user at the selected location.

Figure 8:
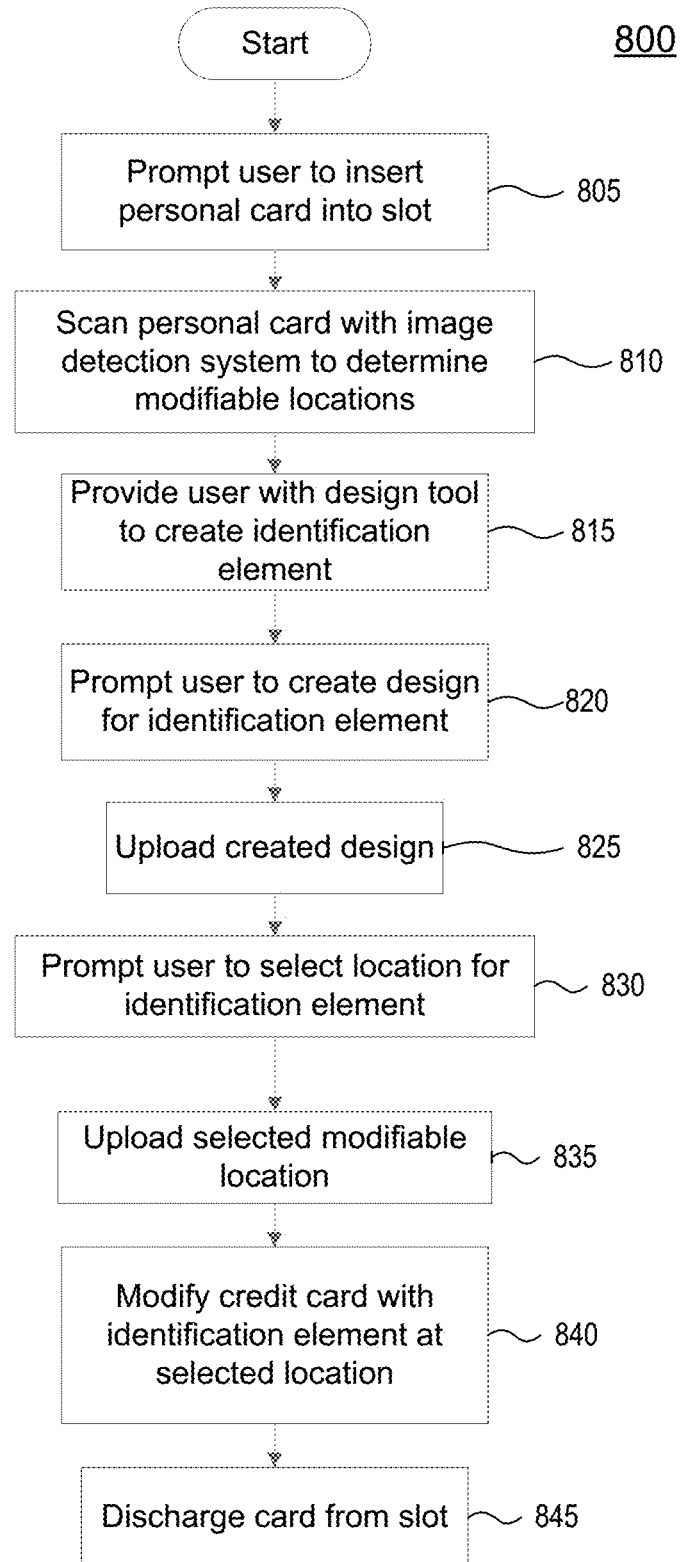
FIG. 8 depicts a flow diagram of another alternative example method in accordance with one or more illustrative aspects discussed herein.

Another alternative method 800 of adding an identification element 240A-E to a personal card 205 is shown in FIG. 8. At step 805 of FIG. 8, server device 101 prompts a user to insert a personal card 205 into slot 302 of server device 101. In certain embodiments, as discussed above, server device 101 may be a stand-alone device, such as a kiosk, which includes a slot into which the user inserts personal card 205. At step 810, server device 101 may scan the personal card 205 with image recognition software 131 to determine non-modifiable areas of personal card 205 that include any of magnetic strips, chips, text, photos, and images and identify modifiable locations proximate edges 250 of personal card 205. Thus, server device 101 can restrict where the user is allowed to position an identification element 240A-E on personal card 205 so that the identification element 240A-E does not interfere with the text, images, photos, chips, magnetic strips, and other elements on personal card 205.

At step 815, server device 101 may provide the user with a design tool of design software 127 to create an identification element 240A-E to be added to an exterior surface 255 of the user's personal card 205. At step 820, server device 101 may prompt the user to create a design element using the design tool of design software 127. As discussed above, the on-line tool may allow the user to select an identification element 240A-E from a set of pre-selected design elements. In other embodiments, the on-line tool of design software 127 may allow the user to create a freeform design of any type for the identification element 240A-E. In yet further embodiments, the on-line tool of design software 127 may allow the user to upload a scanned image of a design for the identification element 240A-E.

At step 825, server device 101 may upload the design created by the user for identification element 240A-E. At step 830, server device 101 may prompt the user to select one of the modifiable locations on personal card 205 for identification element 240A-E. At step 835, server device 101 may upload the selected modifiable location. At step 840, server device 101 may modify the exterior surface 255 of personal card 205 with the identification element 240A-E created by the user at the selected location using card modifier 112. At step 845, server device may discharge personal card 205 from slot 302.

By having a server device that can add an identification element to personal cards of a user, the user can more easily distinguish between different cards in their wallet or purse, as well as more easily remove the personal cards from their wallet or purse.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising: prompting, by a server device, a user to access an on-line tool to create an identification element to be added to an exterior surface of a personal card; receiving, by the server device, the identification element created by the user; scanning, by the server device, an image of the personal card; detecting, by the server device with an image detection system, areas on the personal card where existing magnetic strips, chips, text, photos, and images are located; determining, by the server device, a plurality of areas on the personal card free of existing magnetic strips, chips, text, photos, and images; prompting, by the server device, the user to select one of the plurality of areas for a location for the identification element; receiving, by the server device, the location for the identification element selected by the user; modifying, by the server device, an exterior surface of the personal card to include the identification element at the selected location; and delivering the personal card to the user.

2. The method of claim 1, wherein the exterior surface is modified such that the identification element is one of a raised element on the exterior surface, an indentation on the exterior surface, and a cutout in the exterior surface.

3. The method of claim 1, wherein the on-line tool provides the user with a plurality of pre-selected identification elements from which to choose the identification element.

4. The method of claim 1, wherein the on-line tool provides the user with the ability of create a freeform element as the identification element.

5. The method of claim 1, further comprising:
prompting the user to provide a personalized element to be used as the identification element on the personal card;
scanning the personalized element;
uploading the scanned personalized element to the on-line tool; and
modifying the exterior surface of the personal card with the scanned personalized element at the selected location.

6. The method of claim 1, wherein the server device is part of a stand-alone kiosk.

7. A system comprising: a server device having a database of images of a plurality of existing credit cards of a user; the server device configured to: provide a user with an on-line tool to create an identification element to be added to an exterior surface of an additional credit card of the user; receive, by the server device, the identification element created by the user; scan, by the server device, an image of the additional credit card; detect, by the server device with an image detection system, areas on the additional credit card where existing magnetic strips, chips, text, photos, and images are located; determine, by the server device, a plurality of areas on the additional credit card free of existing magnetic strips, chips, text, photos, and images; prompt the user to select a location from the plurality of areas; receive, by the server device, the selected location; and modify the exterior surface of the additional credit card to include the identification element at the selected location as one of a raised element on the exterior surface, an indentation on the exterior surface, and a cutout in the exterior surface.

8. The system of claim 7, wherein the server device is further configured to:
provide the user with a set of pre-selected identification elements with the on-line tool;
prompt the user to select one of the pre-selected identification elements; and
modify the exterior surface of the additional credit card with the selected identification element at the selected location.

9. The system of claim 7, wherein the server device is further configured to:
prompt the user to provide a plurality of credit cards; and
scan each of the plurality of credit cards to create the database of images.

10. The system of claim 9, wherein the on-line tool allows the user to create a freeform element as the identification element.

11. The system of claim 7, wherein the server device is further configured to:
prompt the user to provide a personalized element to be used as the identification element on the additional card;
scan the personalized element;
upload the scanned personalized element to the on-line tool; and
modify the exterior surface of the additional credit card with the scanned personalized element at the selected location.

12. The system of claim 7, wherein the server device is further configured to:
detect a symbol designating an area of the additional credit card that is not modifiable.

13. The system of claim 7, wherein the locations for locating the identification element are proximate edges of the additional card and outward of any of magnetic strips, text, and photos on the additional card.

14. The system of claim 7, wherein the server device is part of a standalone kiosk.

15. The system of claim 7, wherein the server device is further configured to:
receive specifications from issuers of the plurality of existing credit cards regarding modifiable locations on the plurality of existing credit cards where identification elements can be located.

16. One or more non-transitory media storing instructions that, when executed by one or more processors, cause the one or more processors to perform steps comprising: prompt a user to insert a personal card into a slot of a server device; scan, by the server device, the personal card with an image detection system to determine non-modifiable areas on the personal card that include any of magnetic strips, chips, text, photos, and images and identify modifiable locations proximate edges of the personal card that are devoid of any of magnetic strips, chips, text, photos, and images; provide the user with a design tool to create a design for an identification element to be added to an exterior surface of the personal card; prompt the user to create a design for the identification element to be added to the personal card; upload, to the server device, the element created by the user; prompt the user to select one of the modifiable locations on the personal card for the identification element; upload, to the server device, a location selected by the user; modify the exterior surface of the personal card with the identification element created by the user at the selected location; and discharge the personal card from the slot of the server device.

17. The one or more non-transitory media of claim 16, further comprising:
scan an image of an identification element provided by the user; and
upload the scanned image of an element to the server device,
wherein the exterior surface of the personal card is modified with the scanned image of the identification element.

18. The one or more non-transitory media of claim 16, wherein the personal card includes a symbol designating an area of the personal card that is not modifiable.

19. The one or more non-transitory media of claim 18, wherein the symbol is not visible.

20. The one or more non-transitory media of claim 16, wherein the server device is part of a standalone kiosk.

* * * * *